Nov. 17, 1931.  F. A. LEIB  1,832,035
GRADING MACHINE
Filed Jan. 11, 1928  2 Sheets-Sheet 1
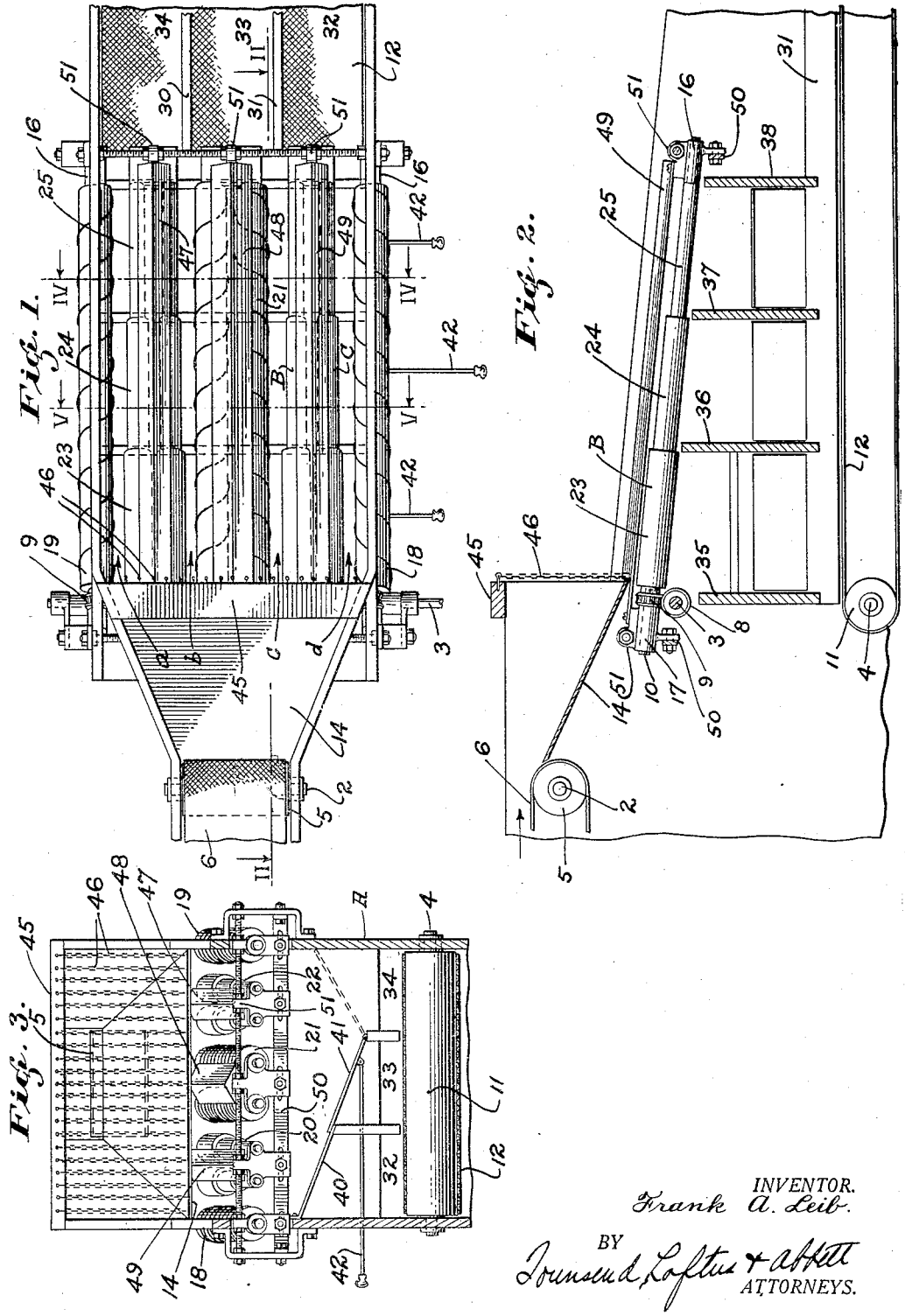
INVENTOR.
Frank A. Leib.
BY
Townsend, Loftus & Abbett
ATTORNEYS.

Nov. 17, 1931.               F. A. LEIB               1,832,035
                          GRADING MACHINE
                     Filed Jan. 11, 1928        2 Sheets-Sheet  2
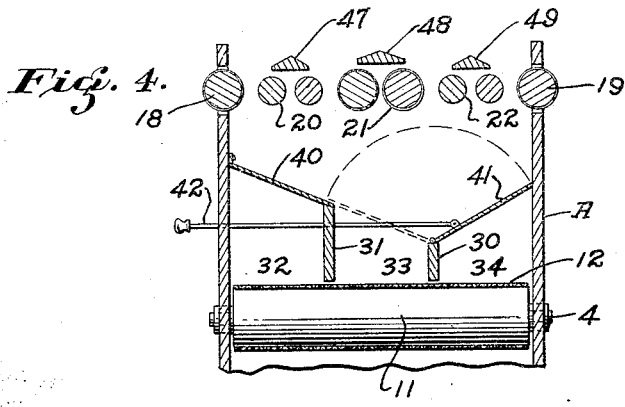
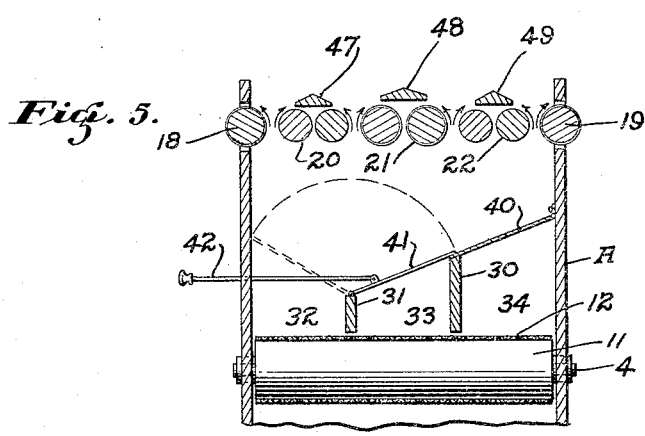
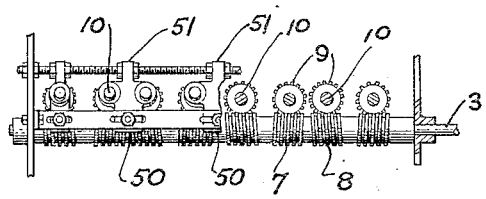
INVENTOR.
Frank A. Leib.
BY
ATTORNEYS.

Patented Nov. 17, 1931

1,832,035

UNITED STATES PATENT OFFICE

FRANK A. LEIB, OF SAN JOSE, CALIFORNIA

GRADING MACHINE

Application filed January 11, 1928. Serial No. 245,880.

This invention relates to improvements in grading machines of the type which are employed in separating materials in bulk into a number of predetermined grades; the invention having particular reference to a machine of this general character which is specially designed and adapted for use in grading walnuts and the like.

The object of the present invention is to generally improve and simplify the construction and operation of grading machines of the character described; to provide a machine of large capacity; to provide a machine adapted to separate nuts or the like into two or more grades or sizes, if desired; to provide a machine which is adjustable to increase or decrease the size of the grades; and further to provide means whereby the grades after separation may be mixed, if desired. The invention is shown by way of illustration in the accompanying drawings in which:

Fig. 1 is a plan view of the machine,

Fig. 2 is a central vertical longitudinal section taken on line II—II, Fig. 1,

Fig. 3 is a view of the discharge end of the machine, the conveyor belt by which the material is carried away from the machine being shown in cross-section.

Fig. 4 is a cross-section taken on line IV—IV, Fig. 1,

Fig. 5 is a cross-section taken on line V—V, Fig. 1,

Fig. 6 is a detailed view showing the driving mechanism whereby the grading rolls are driven.

Referring to the drawings in detail and particularly Figs. 1, 2 and 3, A indicates a main frame in which is journaled cross-shafts 2, 3 and 4. The cross-shaft 2 supports a pulley 5 and one end of a conveyor belt 6 whereby the nuts or other material to be graded is delivered to the machine. The cross-shaft 3 is a driving shaft and is best illustrated in Fig. 6. This shaft carries a number of worm pinions, such as indicated at 7 and 8, and these pinions in turn intermesh with worm gears 9 secured on shafts 10, which in turn serve as supports for grading rolls hereinafter to be described. The cross-shaft 4 supports a pulley 11 and one end of a conveyor belt 12 which serves as a discharge belt for the graded nuts, as will hereinafter be described.

The nuts or other material to be graded is delivered by the belt 6 to an inclined receiving plate 14. This plate in turn delivers the nuts to the grading rolls generally indicated at B and C. These rolls, as previously stated, are supported by the shafts 10. The shafts 10 and the grading rolls extend longitudinally of the machine and are inclined, as shown in Fig. 2. Bearings, such as indicated at 16 and 17, support the shafts 10, and the grading rolls and the bearings are adjustably supported so that the spacing between the grading rolls may be increased or decreased, as desired.

In the present instance eight grading rolls are shown. Six of the rolls are arranged in pairs while the remaining two rolls are arranged singly. These latter rolls are indicated at 18 and 19 and are disposed on opposite sides of the machine, the six remaining rolls which are grouped in pairs being indicated at 20, 21 and 22. The rolls indicated at 18, 19 and 21 are of uniform diameter from end to end, while the rolls indicated at 20 and 22 are of step formation, there being three steps as indicated at 23, 24 and 25. The number of steps employed may be increased or decreased when conditions may demand and the number of steps employed determines the number of grades that it is possible to obtain.

An important feature of the present invention is the provision of a grading means whereby uniform and exact grading can be obtained, i. e., if it is desired, for instance, to separate walnuts into three grades, rollers provided with three steps will be employed. The small sized nuts will fall between the grading rolls at the point 23; the medium sized at the point indicated at 24; and the large sized nuts at the point indicated at 25. It is also important that all the nuts which pass between the rolls at one point or another must be as uniform in size as possible. To insure this uniformity it is essential that one grading roll rotates at a greater speed than an adjacent roll or it is at least necessary that the peripheral speed of one grading roll is greater than an adjacent roll. By employing two grading rolls, wherein one surface is rotating at a greater speed than the other, it is possible to rotate the nuts about their longitudinal axis. Such rotation of the nuts about their longitudinal axis will cause them to present their smallest diameter to the grading rolls and they will, accordingly, drop through at the proper point. To obtain this particular action and result, the grading rolls, indicated at 18, 19 and 21 are made as large in diameter as possible, i. e., their diameter is at least larger than the largest diameter of the step rolls, indicated at 20 and 22. The difference in peripheral speed between the grading rolls at the point indicated at 23 is the least. It is greater at the point 24 and greatest at the point 25. This is important as the larger the nut or grade, the greater the importance of uniformity in size, i. e., the larger grade nuts obtain the best price and they are subjected to a more thorough inspection than the smaller or poorer grades. Walnuts are usually graded into three sizes and these grades are commonly known in the trade as large, fancy and baby. The baby grade drops through at the point 23, the fancy at the point 24 and the large at the point 25. It also happens that some nuts are so large that they will not drop through at the point 25, and such nuts pass over the ends of the rolls, but they are, nevertheless, delivered to the discharge conveyor 12 at the same point as the nuts which discharge at the point 25. The extra large nuts which cannot drop through may be termed a fourth grade, but as there is no particular demand for this grade, it is common practice to mix them with the large, which pass through at the point 25. If a demand should be created for the extra large size, it would only be necessary to discharge them at a point separate from the large size which pass through at 25. In that case four grades would be obtained.

In the present instance the conveyor belt 12 is made sufficiently wide to remove the several grades of nuts. Longitudinally extending division strips, such as indicated at 30 and 31, are however provided and these strips divide the surface of the belt so that the small or baby size discharge with the belt at the point 32, the fancy or medium size at the point 33 and the large and extra large size at the point 34. Cross partition members, such as indicated at 35, 36, 37 and 38 are also required. These cross partition members are arranged at the stepped ends of the grading rolls, and inclined bottom sections are disposed between the partition members 35, 36, 37 and 38, as indicated at 40 (see Figs. 3, 4 and 5). A hinge gate plate 41 is also employed and this may be swung to assume one or another of the positions shown in full and dotted lines in the figures just referred to. The hinge gates together with the inclined bottom sections 40 are disposed above the conveyor belt 12 and they serve as deflectors to direct the nuts or material to be graded to one or another of the divisions of the belt, indicated at 32, 33 and 34. The gates may be operated in any suitable manner, or as here illustrated, by push and pull rods 42 which extend through one side of the machine where they may be readily grasped and manipulated when required. By throwing the gates to one position or another, it is possible to mix certain grades after separation or it is possible to maintain the grades separated, for instance it sometimes happens that the fancy and baby grades are mixed for the market. In that case, the discharge from the steps 23 and 24 of the grading rolls is directed by positioning the gates 41 to the central division 33 of the belt.

The receiving plate 14 is inclined and is widened out toward its lower end so as to act as a spreader. A cross bar 45 is disposed above the plate and a number of chains 46 are suspended therefrom. The nuts rolling down the inclined plate 14 are spread out by the downwardly hanging chains 46 and the nuts to be graded are thus uniformly distributed to the grading rolls. The nuts enter the grading rolls at the points indicated by the arrows $a$, $b$, $c$ and $d$, triangular shaped deflecting members, such as indicated at 47, 48 and 49 being employed to prevent the nuts from entering between the grouped pairs of rolls, indicated at 20, 21 and 22. The grading rolls together with the deflecting plates 47, 48 and 49 form what might be termed a grading table, i. e., an inclined table in which a series of troughs are formed, the troughs being formed between the grading rolls at the points indicated by the arrows $a$, $b$, $c$ and $d$. The troughs have a step-like formation due to the shape of the grading rolls, indicated at 20 and 22 and the different grades or sizes are thereby obtained.

Due to the fact that the inspectors of graded nuts are very exacting, it is important that the grading rolls be rigidly supported and also that they be capable of adjustments so that the size of the grades may be varied from one season to another, for at certain seasons the general range of nuts may be fairly large and at other seasons, the general range may be fairly small, thus the size in each grade may be varied from season to season. To take care of this particular condition adjustable bearings are provided, as indicated at 16 and 17. These bearings are supported by cross bars at the lower ends as indicated at 50. The cross bars are slotted and bolts extending through the lower ends of the bearings and the slotted cross bars permit adjustment of the bearings and the grading rolls supported thereby in a lateral direction. An upwardly extending lug is formed on each bearing, as indicated at 51. A threaded rod extension through these lugs and lock nuts are arranged on each side. The bearings may thus be rigidly secured at both the upper and lower ends and they may be laterally adjusted at both ends and exacting conditions and adjustments may thus be readily taken care of. The mounting and construction of the bearings 16 and 17 are identical so that the description of one set of bearings should suffice.

By referring to Figs. 1 and 3, it will be noted that the grading rolls indicated at 18, 19 and 21 are provided with a projection on the exterior surface in the form of a helix. This projection may be made in any suitable manner, for instance by winding wire or the like around the exterior surface and securing it. The helical projection serves two functions, first that of advancing the nuts from end to end of the grading rolls, and secondly, that of assisting in imparting rotary motion to the nuts or material to be graded about their longitudinal axis. The projection may, of course, be made of any suitable material, for instance an anti-friction material may be desired in certain instances to promote rotation of the articles being graded. It is true that the grading rolls slope from end to end, as shown in Fig. 2 and that this to a certain extent takes care of the gradual advancement of the nuts from end to end, but actual practice has determined that the helical projection on the surface of certain rolls is a decided advantage as it insures a positive feed.

While the machine has been described in conjunction with the grading of walnuts, it is obvious that it may have other uses, for instance, the grading of other varieties of nuts, fruits, vegetables and other materials in general.

While certain features of the present invention are more or less specifically described, I wish it understood that various changes may be resorted to within the scope of the appended claims. Similarly, that the materials and finishes of the several parts employed may be such as the manufacturer may decide or varying conditions or uses may demand.

Having thus described my invention, what I claim and desire to secure by Letters Patent is:—

1. A grading machine comprising an elongated roll, a second roll interspaced with relation thereto and presenting a stepped surface, means whereby the rolls are rotated in a direction where their upper surfaces will rotate away from each other, means for delivering objects to be graded at one end of the rolls, inclined plates and partition members arranged crosswise of the rolls adjacent the end of each step and below the rolls to receive the objects separated by the rolls, a discharge gate in each inclined plate, a conveyor belt disposed below the same, means whereby the gates are adjusted to discharge to different portion of the belt, and means cooperating with the belt to maintain the objects discharged thereon separated.

2. In a machine of the character described, a pair of grading rolls, a shaft supporting each roll, bearing members on opposite ends of the shaft, a plate-like member supporting each bearing, a cross-bar cooperating with each plate, means permitting lateral adjustment of the plates with relation to the cross-bars, said means also securing the plates and the bearings with relation to the cross-bars, an upwardly projecting lug on each plate above the bearings, a rod extending therethrough, and adjusting and securing means on the rod.

FRANK A. LEIB.